April 17, 1956     H. E. HANCOCK ET AL     2,742,035
DEVICE FOR DETERMINING VIBRATION SENSITIVITY
Filed Feb. 17, 1953     2 Sheets-Sheet 2
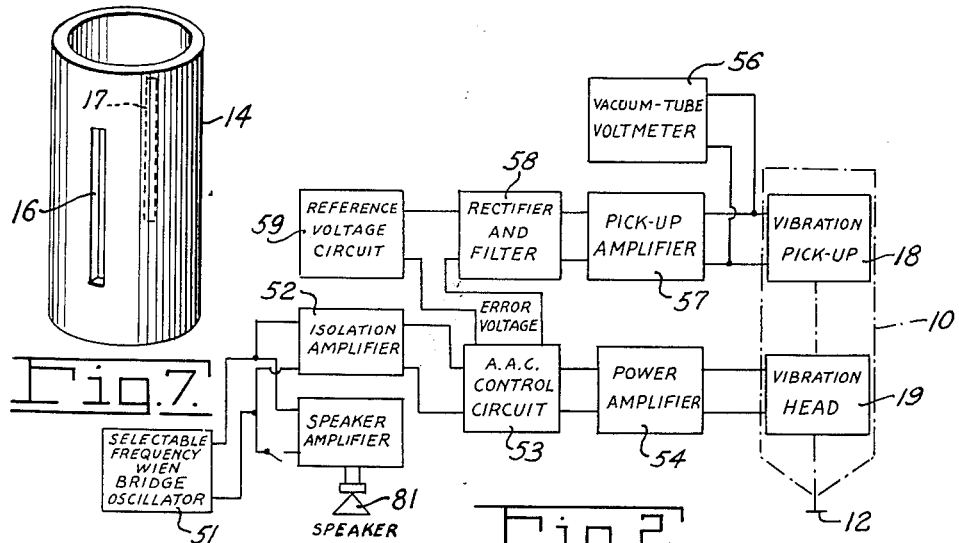
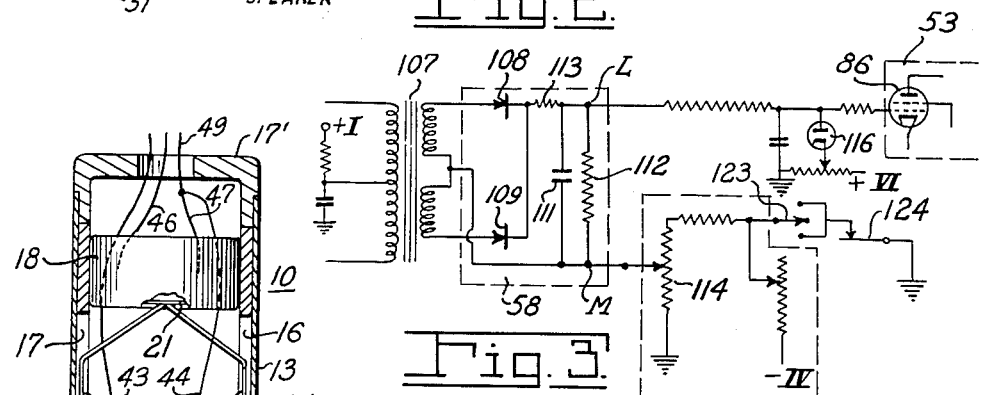
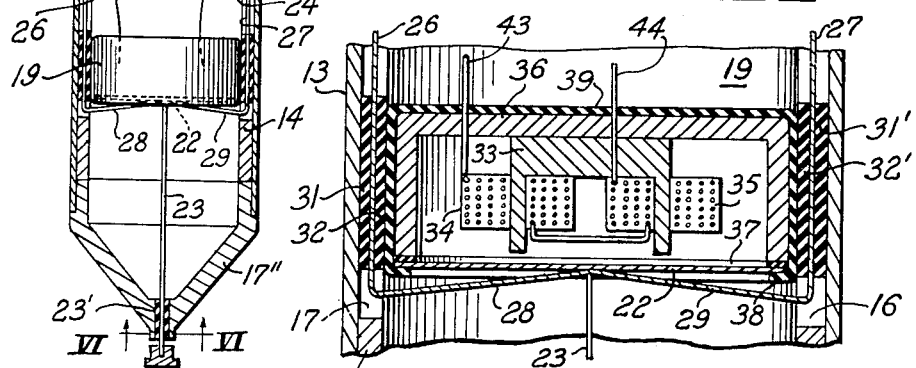
INVENTORS.
HAROLD E. HANCOCK
SAMUEL GOLDBLATT
JERRY M. MASON
BY Zugelter & Zugelter
Attys.

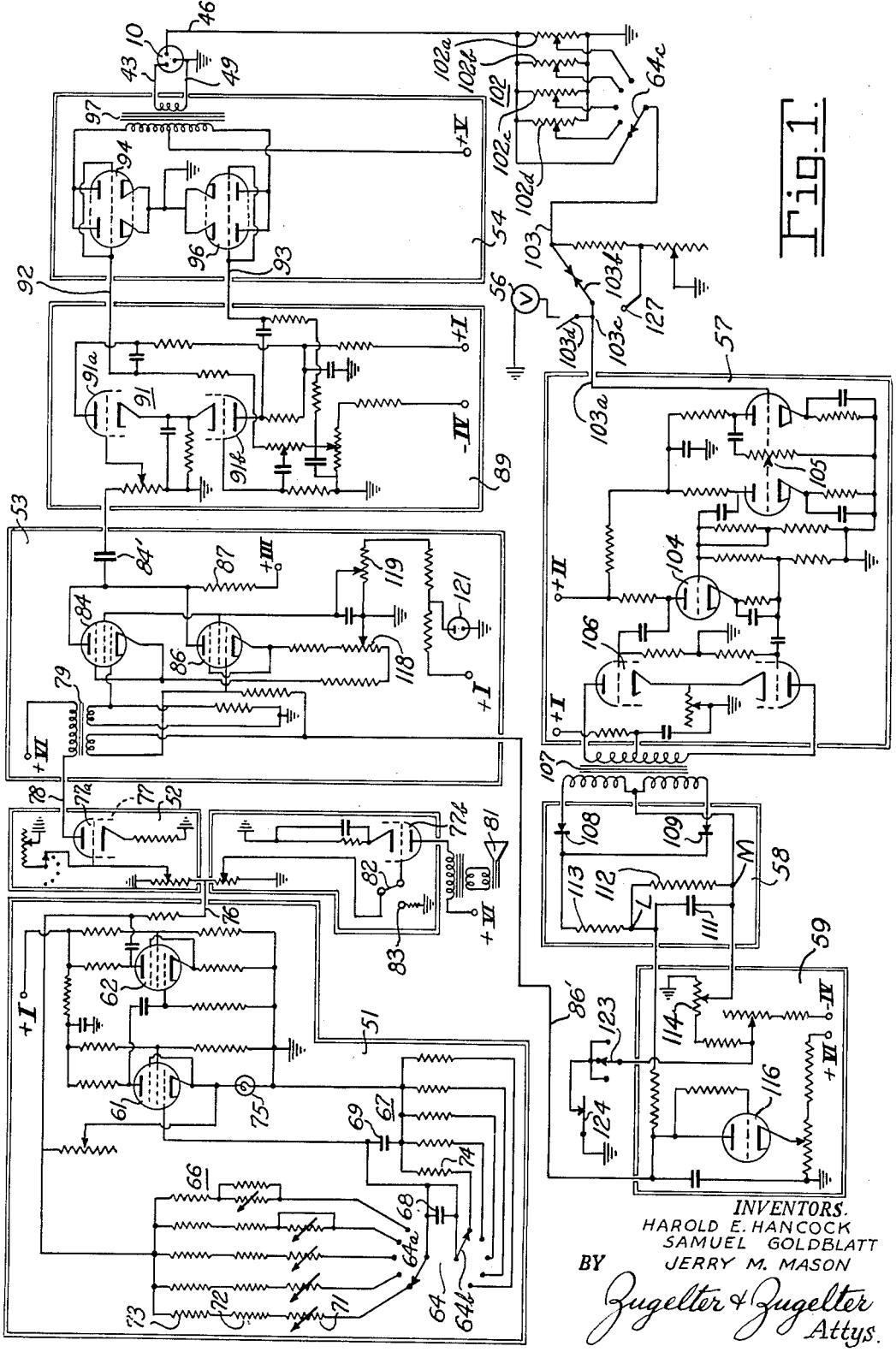

United States Patent Office
2,742,035
Patented Apr. 17, 1956

2,742,035

DEVICE FOR DETERMINING VIBRATION SENSITIVITY

Harold E. Hancock, Clermont County, and Samuel Goldblatt and Jerry M. Mason, Cincinnati, Ohio; said Hancock and said Mason assignors to said Goldblatt Application February 17, 1953, Serial No. 337,348

7 Claims. (Cl. 128—2)

This invention relates to an electronic pallometer or device for testing sensitivity to externally applied vibration.

Human beings suffering from certain pathological conditions have an impaired sensibility to vibration. The degree of impairment may be measured by the pallometer of our invention and utilized in the diagnosis of such pathological conditions.

Vibration appreciation is depressed in such pathological conditions as diabetes, syphilis, hypothyroidism, leukemia, and many others. As such conditions progress, the depression of vibratory appreciation is a measure of the progress of the disease. On the other hand, when such conditions improve in response to proper treatment, the vibratory appreciation is improved. The level of improvement in vibratory appreciation is a measure of the success of treatment.

The determination of vibration appreciation heretofore has been made by applying the stem of a tuning fork to the bony protuberances of the body as described in an article by applicant, Goldblatt, entitled "Pallhypethesia," 59 Archives of Neurology and Psychiatry, 292–301 (1948). The determination of the level of vibratory appreciation by means of a tuning fork is a time consuming task.

An object of this invention is to provide a machine having a patient-engaging vibratory tip or probe which can be caused to vibrate like the stem of a tuning fork.

A further object of this invention is to provide a machine having a probe which can be caused to vibrate at any one of several selected frequencies.

A further object of this invention is to provide such a machine having a probe which can be caused to vibrate with a predetermined amplitude of vibration.

A further object of this invention is to provide such a machine in which the amplitude of vibration can be controlled with precision over wide ranges of amplitude of vibration.

A further object of this invention is to provide a machine of this type in which the amplitude of vibration can be maintained constant as the load on the probe is varied, within the limits of the machine.

A further object of this invention is to provide an electronic pallometer having an electromagnetic device provided with a vibratable member or probe element adapted to engage the body of a patient at any desired location, the pallometer being provided with means for adjusting the frequency of vibration of the vibratable member.

Another object of the invention is to provide an electronic circuit for a pallometer whose output is utilized to energize the electro-magnetic device and vibrate its probe element at a predetermined frequency, the electro-magnetic device being provided with means for developing an output voltage that is substantially proportional to the amplitude of vibration of the probe element, the circuit being provided with means responsive to the output voltage to stabilize and regulate the amplitude of vibration to a predetermined value.

A further object of the invention is to provide an electronic circuit and electro-magnetic device as set forth in the preceding object, with means for adjusting the amplitude of vibration of the probe element to a predetermined value and regulating the amplitude at that value.

A still further object of this invention is to provide an electro-magnetic device for an electronic pallometer, with a probe element having rectilinear reciprocating motion.

Another object of the invention is to provide an electro-magnetic device for a pallometer that is provided with an electric input responsive device having a member that vibrates a probe element at a frequency and amplitude proportional to the frequency and voltage of the input, and an electro-magnetic output device having an electro-magnetic coupling member connected to and vibrated by the probe element vibrator, adapted to generate a feed-back or output voltage whose frequency and amplitude are proportional to the frequency and amplitude of the probe element.

The above and other objects and features of this invention will in part be apparent and will in part be obvious from the following detailed description, and the drawing, in which:

Figure 1 is a more or less diagrammatic view of an electronic circuit for a pallometer arranged and constructed in accordance with an embodiment of this invention;

Fig. 2 is a block diagram of the circuit of the machine;

Fig. 3 is a view showing the pickup or feed-back voltage, reference voltage, and input voltage features of the circuit shown in Figure 1, whereby amplitude of vibration of the pallometer probe element is regulated to predetermined values;

Fig. 4 is a view in longitudinal section of a tool or head containing an electro-magnetic device having a vibratable probe element, embodying a feature of the pallometer;

Fig. 5 is a partial enlarged view in longitudinal section of the device shown in Fig. 4;

Fig. 6 is an enlarged view in section taken on a line VI—VI of Fig. 4; and

Fig. 7 is a view in side elevation of a sleeve embodied in the device of Figs. 4 and 5.

As illustrated in Fig. 1, the pallometer includes an electronic circuit and an electromagnetically operated head or tool 10 which is energized by the circuit and caused to produce vibrations that are used in diagnosis by determining sensitivity to vibration. The device 10 is provided with a probe element 12 (Fig. 4) that vibrates at a predetermined frequency and amplitude as controlled by the circuit 9. Probe 12 is applied to bony protuberances of the body of a patient. By adjusting the frequency, or the amplitude, or both, of vibration of probe element 12, the sensitivity to vibration can be measured and used in the diagnosis and treatment of the pathological condition of the patient.

The head 10 includes an outer cylindrical case 13 and an inner sleeve 14. The sleeve 14 is received inside the outer case 13 and is frictionally held therein. As shown in Fig. 7, the inner sleeve 14 is provided with lengthwise slots 16 and 17 in the walls thereof. An annular cap 17' and a funnel-shaped lower end member 17" are frictionally held in opposite ends of inner sleeve 14. The inner sleeve 14 supports two spaced electro-magnetic vibrating units or transducers 18 and 19. The transducer unit 18 is a mechanico-electrical transducer transforming mechanical energy into electrical energy and is provided with a diaphragm or armature 21. The transducer unit 19 is an electro-mechanical transducer transforming electrical energy into mechanical energy and is provided with a diaphragm or armature 22. As shown in Fig. 5, the diaphragm 22 is attached to a shaft 23. Shaft 23 projects through the lower end of member 17″ and carries the probe 12 (see Fig. 4) so that the probe 12 vibrates with the diaphragm 22. A sponge rubber ring 23′ in the small end of lower end member 17″ keeps the shaft 23 centered therein. As will be explained in greater detail hereafter, the transducer unit 19 is supplied with an oscillating potential of predetermined frequency and voltage to cause the diaphragm 22 and probe 12 to vibrate with the predetermined frequency and with a predetermined amplitude of vibration. The probe vibrates with a rectilinear reciprocating motion and the ring 23′ guides the shaft 23 and the probe 12 for reciprocation.

The diaphragms 21 and 22 are linked together by a yoke 24. The yoke 24 includes arms 26 and 27 which extend on opposite sides of transducer 19, as shown in Fig. 5. The upper ends of arms 26 and 27 are attached to the center of diaphragm 21 (Fig. 4) by soldering or the like. The lower ends of arms 26 and 27 are integrally formed with rigid arms 28 and 29 (Figs. 4 and 5), respectively. The arms 28 and 29, in turn, are attached to shaft 23 and to the center of the diaphragm 22 of transducer 19 by soldering or the like. The yoke is rigid so that the diaphragms vibrate together.

Arm 26 of yoke 24 is received in the slot 17 of sleeve 14, while arm 27 is received in the slot 16 of inner sleeve 14. As shown in Fig. 5, the arm 26 is received between sponge rubber damper members 31 and 32 which are also received in the slot 17. Arm 27 is similarly received between sponge rubber damper members 31′ and 32′. These sponge rubber damper members damp out extraneous vibration of the yoke 24 and prevent the arms from engaging the outer sleeve 13 and the transducer 19.

The electromagnetic input and output vibrating units or transducers 18 and 19 are identical in construction and only the construction of the unit 19 will be described in detail. The unit 19 (Fig. 5) comprises a U-shaped permanent magnetic core 33 having series connected coil windings 34 and 35 on the legs of the core. The core and coils are mounted within and secured to an inverted cup-shaped member 36, which may be of copper. The diaphragm or armature 22 of unit 19 is of magnetic material and is disk-like in form. The edge of diaphragm 22 is spaced from member 36 by a gasket 37. The edge of diaphragm 22 is secured by an inturned flange 38 of an outer case 39 of plastic or other suitable material.

The diaphragm is spaced from the ends of the legs of the U-shaped core 33 by an air gap. The diaphragm is resilient and spring-like. When an alternating voltage is set up across leads 43 and 44 of unit 19, the voltage is applied to the coil windings of unit 19 and the diaphragm 22 thereof vibrates with the frequency of the voltage and the amplitude of vibration varies with the amplitude of the voltage.

The shaft 23 is secured to the diaphragm 22 of unit 19 preferably at its center. The unit 18 is identical in construction with unit 19. As shown in Fig. 4, the upper ends of the arms of the yoke 24 are attached to the center of the diaphragm 21 of unit 18 so that the shaft 23 and the diaphragms of the units vibrate in unison and with probe 12, which is attached to shaft 23. Vibration of the diaphragm of unit 18 sets up a potential across leads 46 and 47 of transducer 18. The potential set up across leads 46 and 47 is utilized in determining and controlling the amplitude of vibration of the probe 12. As shown in Fig. 4, leads 44 and 47 are connected together so that three leads 43, 46, and 49 extend from the head.

In Fig. 2, the electrical circuits of the present machine are indicated diagrammatically. An oscillating electrical potential of predetermined frequency is set up by an oscillator circuit 51. This oscillating potential is amplified in an amplifier circuit 52 and the amplified oscillating potential from amplifier circuit 52 is introduced into an automatic amplitude control circuit 53, hereinafter referred to as the A. A. C. circuit. The voltage of the output of the A. A. C. circuit is regulated by the potential set up in the pick-up transducer 18. The output of the A. A. C. circuit 53 is amplified by an amplifier 54 and the amplified output of the A. A. C. circuit 53 is impressed on the coils of the transducer 19 to cause the probe 12 to oscillate with the predetermined frequency of oscillation.

The potential set-up in the pick-up transducer 18 may be measured with a vacuum tube voltmeter 56 of appropriate type to determine the voltage output and the amplitude of vibration of the probe 12. For a constant frequency, the amplitude of the voltage generated in the pick-up transducer is proportional to the amplitude of displacement of the probe 12. In addition, the potential set up in pick-up transducer 18 is amplified in a pick-up amplifier 57 and the amplified pick-up potential is rectified and filtered in a rectifier and filter circuit 58. The rectified and filtered amplified pick-up potential is then automatically balanced against a reference voltage from a reference voltage circuit 59. The A. A. C. circuit is controlled by the reference voltage and by the pick-up potential, as will be described in greater detail hereinafter. The A. A. C. circuit causes a sufficient amplitude of vibration of the probe 12 and the transducer diaphragms to make the amplified potential developed by the pick-up transducer approach the reference voltage. The amplitude of vibration is controlled by varying the reference voltage.

The electrical circuit which has been referred to in general terms hereinabove, will now be described in greater detail with reference to Fig. 1, which is a circuit diaphragm of the electrical circuits of the machine.

The oscillator circuit 51 includes electronic tubes 61 and 62 and associated components. A potential is impressed on the tubes by a source of direct current indicated by +I which is positive with respect to ground and may be 390 volts. The frequency of the output of the oscillator circuit is varied by means of a frequency control switch 64 having leaves 64a and 64b in the oscillator circuit which turn together. Switch 64 also has a leaf 64c which turns with the other leaves of switch 64 and which will be described in greater detail hereinafter. The switch leaf 64a controls a bank of resistances 66, while switch leaf 65b controls a bank of resistances 67. The switch leaves 64a and 64b are connected through condensers 68 and 69. When the switch leaves 64a and 64b are in the position shown, resistances 71, 72, and 73 of bank 66 are in the circuit and a resistance 74 of bank 67 is also in the circuit. The resistance 71 is adjustable and is adjusted so that the output of the oscillator circuit, when the switch 64 is in the position shown, is at a selected frequency, for example, 70 cycles per second. The oscillator circuit is constructed so that for each position of the switch 64, a signal of a selected frequency is sent out. These signals may be 70, 120, 240, 480, and 960 cycles per second for the various positions of switch 64. The values of the electrical components of the oscillator circuit are selected to provide such frequencies of oscillation. The amplitude of the output of the oscillator circuit is stabilized by a lamp 75.

The output of the oscillator circuit is carried by a lead 76 which is connected to the grids of a tube 77 having two halves. One half 77a of tube 77 is an amplifier and is an amplifier circuit 52. The amplified output of the oscillator circuit is carried by a lead 78 which is connected to one end of a primary coil of a transformer 79 in the automatic amplitude control or A. A. C. circuit 53. The other end of the primary coil of transformer 79 is connected to a source of direct current potential indicated by +VI which may be 150 volts and is positive with respect to ground.

The other half 77b of tube 77 is a speaker amplifier and supplies an impulse for operating a speaker 81. The speaker emits a tone of the same frequency as that of vibration of the probe 12 so that the sound of the speaker 81 can cover or mask the sound caused by vibration of the probe 12 and the patient can not determine whether the probe is vibrating by the tone emitted thereby. The speaker can be turned off and on by a speaker switch 82. The speaker switch can be swung to engage a contact 83 to ground the grid of tube half 77b and turn off the speaker.

The A. A. C. circuit includes two voltage amplifier tubes 84 and 86 having grids connected in push-pull by the transformer 79. The plates of tubes 84 and 86 are connected together, and, through a common 100,000 ohm load resistor 87 to a source of potential +III which is positive with respect to ground and may be +155 volts. The gain of tube 86 is controlled by an error-voltage which is obtained through a lead 86' by means to be discussed later. The gain of tube 84 is essentially constant. As shown, the inputs to the grids of the tubes 84 and 86 are push-pull inputs supplied by transformer 79, and the inputs are 180° out of phase, but of equal magnitude. When zero error-voltage is applied to the grid of tube 86, the gains of tubes 84 and 86 are the same, and since their outputs are 180° out of phase, there is zero varying current output from the A. A. C. circuit. The output of the A. A. C. circuit 53 is connected through a condenser 84' to a phase inverter circuit 89. When an error-voltage is applied to tube 86, the gain of tube 86 is reduced, making its output less than that of tube 84 but still 180° out of phase. The output of the A. A. C. circuit is proportional to the difference of the outputs of tubes 84 and 86. The gain of tube 86 is inversely proportional to the amount of the error-voltage so that the output of the A. A. C. circuit is proportional to the error-voltage, increasing as the error-voltage increases.

The output of the A. A. C. circuit 53 is connected through the condensor 84' to a phase inverter circuit 89. The phase inverter circuit 89 includes a tube 91 having two halves 91a and 91b with associated components. The phase inverter circuit receives power from power sources −IV and +I. The power source −IV is negative with respect to ground and may be −158 volts. The power source +I is positive with respect to ground and may be the same as the source +I in oscillator circuit 51.

The output of the phase inverter circuit through leads 92 and 93 is coupled to a push-pull amplifier in amplifier circuit 54. The amplifier includes two tubes 94 and 96. An output transformer 97 receives power from the tubes 94 and 96. The output of the transformer, in turn, powers the operating head 10 through leads 43 and 49.

The electro-mechanical transducer 19 in the vibrating head 10 (Figs. 4 and 5) is provided with a constant magnetic field supplied by permanent magnet 33. This constant magnetic field is weakened or strengthened in accordance with the driving current supplied by the power amplifier and causes the diaphragm 22 to move in accordance with the magnetic field variation. The vibration of diaphragm 22 drives probe 12. As already pointed out, the diaphragm 21 of the mechanico-electrical transducer 18 is mechanically coupled to the probe tip 12 and to the diaphragm 22 so that the diaphragms and probe tip vibrate together. The vibration of diaphragm 21 generates a voltage in the coils of the transducer 18 which, at small amplitudes, is proportional to the derivative of the displacement of the probe 12. For a constant frequency, the amplitude of the voltage generated by transducer 18 may be considered proportional to the maximum displacement of the probe 12.

The voltage from vibration pick-up transducer 18 is carried by lead 46. Lead 46 is directly connected to potentiometer bank 102 containing potentiometers 102a and 102b, 102c and 102d. A selected potentiometer of the bank 102 can be connected to a lead 103 by leaf 64c of frequency control switch 64. The potentiometers of bank 102 compensate for the change of voltage output of the pick-up transducer with change of frequency. The frequency control switch automatically selects the proper potentiometer of bank 102 for each frequency.

The lead 103 is connected to a lead 103a through a decade switch 103b, which will be described in greater detail hereinafter. Vacuum tube voltmeter 56 of appropriate type may be attached to the circuit at the point 103c to measure the voltage and determine the amplitude of vibration for checking the calibration of the machine. A switch 103d may be closed to connect the voltmeter to the circuit.

The lead 103a connects the pick-up voltage from the pick-up transducer to pick-up amplifier circuit 57. The pick-up amplifier circuit includes amplifier tubes 105 and 104 and associated components which amplify the pick-up signal. In addition, the pick-up amplifier circuit 57 includes a phase inverter tube 106 which powers a transformer 107. Power for the tubes of the amplifier circuit is supplied by source of power +II which is positive with respect to ground and may be of a potential of +300 volts. As shown most clearly in Fig. 3, the output from transformer 107 is rectified by a pair of selenium rectifiers 108 and 109 which convert the A. C. voltage to a D. C. amplified pick-up voltage which is positive relative to ground. The ripple voltage is filtered out by a unit including a condenser 111, a shunt resistance 112, and a series resistance 113. The D. C. voltage across the shunt resistance depends only on the amplitude of vibration of the probe 12, and the potential at point L is higher than the potential at point M (see Fig. 3). The voltage across the shunt resistance is added in series with a negative D. C. reference voltage obtained from a constant voltage source labeled −IV, which is minus with regard to ground and may be −158. The reference voltage is varied by varying the position of the tap of an amplitude control potentiometer 114. The algebraic sum of the reference voltage and the voltage across the shunt resistance 112 is called the "error-voltage." The error-voltage is negative in polarity relative to ground and is prevented from ever becoming positive by a rectifier tube 116 and associated components. The error-voltage is connected to the grid of tube 86, which is in the A. A. C. circuit (see Fig. 1).

The operation of the overall circuit is as follows: With reference voltage on the amplitude control potentiometer 114 set at zero, the output of the tube 86 (Fig. 1) is equal to and out of phase with that of tube 84 so that there is no varying current output from the A. A. C. circuit and consequently no vibration of vibration head. Potentiometers 118 and 119 in the A. A. C. circuit are adjusted to cause the output of the A. A. C. circuit to be zero when the error-voltage is zero. A non-varying source of potential is supplied to the potentiometer 119 by means of a source of potential marked +I in the A. A. C. circuit and a constant voltage tube 121 connected thereto.

If the voltage from the amplitude control potentiometer 114 is adjusted to some negative value, the bias of tube 86 is increased, which decreases the output voltage of tube 86. Since the output of tube 84 is constant, it is greater than that of tube 86. Since the output of the A. A. C. circuit increases with the increase in the difference between the outputs of tubes 84 and 86, the output of the A. A. C. circuit has now increased. The output of the A. A. C. circuit is amplified by the power amplifier circuit 54 and drives the vibration head causing the probe 12 to vibrate. The vibration pick-up now generates a voltage proportional to the amplitude of the vibration of the probe 12. This voltage is amplified by the pick-up amplifier 57, rectified by the selenium rectifiers, filtered, and added to the reference voltage selected by the amplitude control potentiometer. Since the reference voltage is negative and the rectified pick-up voltage is positive, the difference voltage (error-voltage) applied to the grid of tube 86 is smaller than the voltage which was originally applied. This tends to reduce the output of A. A. C. circuit, which, in turn, reduces the amplitude of vibration, which reduces pick-up voltage. Hence the error-voltage will tend to be reduced toward zero until it is just sufficiently large to maintain an output amplitude of just sufficient magnitude that the over all system is in equilibrium. It can now be seen that the amplitude must remain constant at a level determined by the reference voltage as selected by the amplitude control potentiometer 114, for any change in the amplitude of vibration causes the pick-up voltage and, consequently, the error-voltage to change in such a direction as to oppose the change in vibration amplitude. The amplitude of vibration is thus forced to remain constant, regardless of any changes in load imposed upon the vibrating head within the limits of the instrument, but may be changed by changing the reference voltage.

When the machine is to be used, the head 10 is held by the operator of the machine and is placed with the probe 12 in engagement with the patient's body at a selected location. A suitable location may be one of the bony protuberances of the patient's body such as a finger or one of the fleshy parts such as the abdomen immediately above the navel. The amplitude control potentiometer is adjusted from zero amplitude to the smallest amplitude of vibration which the patient can distinguish or until the patient can barely distinguish the vibration at a given frequency. This threshold of vibration perception is sharply marked and can be determined with accuracy by the patient.

In order to control the instrument, switches 123 and 124 are provided (see Figs. 1 and 3). When at least one of the switches is open, the head can vibrate. However, when both switches 123 and 124 are closed, the amplitude control potentiometer is grounded and no signal is put out by the machine. When the machine is started, the operator of the machine closes the switch 123. Then, in order to control operation of the machine, the operator can open and close switch 124, which may be a foot switch, to start and stop vibration of the probe 12. When the threshold of appreciation for one frequency has been determined, the frequency control switch 64 is adjusted to cause the probe 12 to vibrate with another frequency and the amplitude of vibration is again adjusted by means of amplitude control potentiometer 114 to determine the threshold of appreciation at the new frequency. During the test, the speaker 81 may be turned on by means of speaker switch 82 so that the tone emitted by speaker 81 masks any tone created by vibration of the probe 12.

A normal person can perceive a vibration having a double amplitude of approximately 0.3 micron at 70 cycles/second, 0.12 micron at 120 cycles/second, 0.07 micron at 240 cycles/second, 0.15 micron at 480 cycles/second and 0.35 micron at 960 cycles. These values are for application of the probe to a finger of the person. If a patient can not perceive vibration of approximately these amplitudes, it is an indication that there is some pathological condition causing a lowering of the threshold level of vibration appreciation. Variations in this threshold level are an indication of the progress of the condition and of the efficacy of treatment. If a patient, having a lowered threshold level of vibration perception is treated and thereafter can perceive vibration of lower amplitude, it is an indication that the treatment is causing improvement in the condition. On the other hand, if only vibration of a greater amplitude can be perceived, there is an indication of a worsening of condition.

In some serious pathological conditions, such as advanced diabetes, the ability to perceive vibration may be lost so that even a vibration having a double amplitude of 100 microns cannot be perceived. The machine illustrated in the drawing is calibrated to provide vibrations of controlled double amplitudes from 0.04 micron to 100 microns. In order to allow the machine to operate over this wide range of vibration amplitudes, the decade switch 103b is provided to spread the lower ten per cent of the operating range over the entire length of the amplitude control potentiometer 114.

In the position shown in Fig. 1 for switch 103b the total pick-up signal from the vibration pick-up is used. In the other position of switch 103b in which the contact thereof engages a contact 127, approximately one-tenth ($\frac{1}{10}$) of the pick-up voltage is used and the vibration amplitude and pick-up voltage will be ten (10) times as much for a given setting of the amplitude control potentiometer 114.

In the drawings sources of direct current potential are indicated by Roman numerals. A plus ($+$) sign in front of the numeral indicates a source which is positive with respect to ground. A minus ($-$) sign indicates a source which is negative, with respect to ground. The values for the various potentials which have been given hereinabove are the values used in the operating device which follows the circuit shown in the drawings.

The machine illustrated in the drawings and described above is subject to structural modification without departing from the spirit and scope of the appended claims.

Having described our invention, what we claim as new and desire to secure by Letters Patent is:

1. A device for testing the sensitivity of a human being to externally applied vibration which comprises a transducer for converting electrical energy into mechanical energy, a vibratable diaphragm for said transducer, a vibratable probe attached to the diaphragm and engageable with a patient, means for supplying an oscillating electro-motive force of predetermined frequency to the transducer to cause the probe to vibrate at said frequency, means for controlling the potential of said power supply to cause the probe to oscillate with a predetermined amplitude, a speaker, and means for causing the speaker to emit a tone corresponding to the predetermined frequency.

2. A device for measuring the sensitivity of a human being to externally applied vibration which comprises a first transducer for transforming electrical energy into mechanical energy and another transducer for transforming mechanical energy into electrical energy, each of said transducers having a vibratable diaphragm, means for rigidly connecting the diaphragms together whereby the diaphragms vibrate in unison, a vibratable probe attached to the diaphragms, means for supplying an oscillating power supply of predetermined frequency to the first transducer to cause the probe to vibrate at said frequency, there being a potential setup in the other transducer, and means connected to the other transducer responsive to the potential set up in the other transducer and connected to the power supply means for controlling the potential of the power supply to cause the probe to oscillate with a predetermined amplitude of oscillation.

3. A device for measuring the sensitivity of a human being to externally applied vibration which comprises a cylindrical case, an electro-mechanical transducer and a mechanico-electrical transducer mounted in said case in spaced relation, each of said transducers having a vibratable diaphragm, a rigid coupling member connecting the diaphragms to cause the diaphragms to vibrate together, a probe attached to the diaphragms and projecting outside the case, whereby the probe is engageable with a patient, means for supplying an oscillating electrical potential of predetermined frequency to the electro-mechanical transducer to cause the diaphragm and probe to oscillate at said frequency, there being a potential setup in the mechanico-electrical transducer, and means responsive to the potential setup in the mechanico-electrical transducer and connected to the power supply means for controlling the potential of the power supply to the first electro-mechanical transducer to cause the probe to oscillate with a predetermined amplitude of oscillation.

4. A device in accordance with claim 3 characterized by the fact that both diaphragms face in the same direction, and that the diaphragms are connected by a yoke having a pair of arms extending around one of the transducers, one end of each arm being rigidly attached to each diaphragm, whereby the diaphragms vibrate together.

5. A device in accordance with claim 3 characterized by the fact that both diaphragms face in the same direction, that the diaphragms are connected by a yoke comprising a pair of arms extending around one of the transducers, one end of each arm being rigidly attached to each diaphragm, whereby the diaphragms vibrate together, said one of the transducers having an outer cover, and sponge rubber damper members on opposite sides of each arm engaging the cover of said one of the transducers and the case of the device to resiliently hold the arms of the yoke spaced from the case of the device and from said one of the transducers and dampen vibration of the yoke and diaphragms.

6. A device for measuring sensitivity of a human being to externally applied vibration which comprises an electro-mechanical transducer and a mechanico-electrical transducer each of said transducers having a vibratable diaphragm, means for rigidly connecting the diaphragms to vibrate together, a vibratable probe attached to the diaphragms and engageable with a patient, an oscillator circuit for supplying an oscillating potential of predetermined frequency, an amplifier circuit connected to the electro-mechanical transducer, an amplitude control circuit, said amplitude control circuit including two electronic tubes, each of said tubes having a control grid, means for supplying an oscillating potential to the control grids 180° out of phase, means for connecting the output of the tubes to said amplifier circuit whereby normally the output of the amplitude control circuit is zero and the probe is stationary, means for supplying a reference voltage of predetermined potential to the grid of one of the electronic tubes to change the gain thereof, whereby an oscillating potential is impressed on the first electro-mechanical transducer to cause the probe to vibrate with said frequency, there being a potential set up in the mechanico-electrical transducer, and means for impressing the potential setup in the mechanico-electrical transducer on the grid of said one of the electronic tubes, the impressed voltage on the grid being of opposite sign from the reference voltage, whereby the potential on the grid of said one of the electronic tubes approaches a constant value and the amplitude of oscillation of the probe is determined by the reference voltage.

7. An electronic pallometer comprising an electronic circuit provided with means for generating an output voltage impulse of selected frequency and amplitude, said circuit being provided with a feed-back control for regulating the amplitude of the output voltage of the circuit, an electronic device having a permanent core, a coil winding thereon, and a resilient vibratable armature spaced from the core in flux-linking relation therewith, whereby the armature is caused to vibrate in accordance with the frequency of said voltage, a probe element secured to said armature and mounted to vibrate with a rectilinear reciprocating motion, said probe element, when applied endwise to a preselected skin area of a patient, transmitting the vibration to the same, the electronic device being provided with means actuated by said armature for generating an output voltage whose amplitude is proportional to the maximum displacement of the probe, said generated output voltage being connected to said feed-back control.

References Cited in the file of this patent

UNITED STATES PATENTS

| | | |
|---|---|---|
| 2,287,406 | Baird | June 23, 1942 |
| 2,625,152 | Frohring | Jan. 13, 1953 |